United States Patent [19]

Borzym

[11] 4,337,680
[45] Jul. 6, 1982

[54] DIE JAW MEMBERS FOR TUBE CUTOFF APPARATUS

[76] Inventor: John J. Borzym, 4820 Schoolbell, Birmingham, Mich. 48010

[21] Appl. No.: 213,296

[22] Filed: Dec. 5, 1980

[51] Int. Cl.³ .............................................. B23D 21/00
[52] U.S. Cl. ........................................ 83/456; 83/54; 83/319; 83/519
[58] Field of Search .................. 83/382, 454–456, 83/294, 318, 319, 320, 54, 519

[56] References Cited

U.S. PATENT DOCUMENTS 3,924,502 12/1975 Borzym .................................. 83/454
4,108,029 8/1978 Borzym .................................... 83/54

Primary Examiner—James M. Meister
Attorney, Agent, or Firm—Krass, Young & Schivley

[57] ABSTRACT

A ram operated tube cutoff apparatus of the type employed for severing successive lengths of tubing emanating from a source such as a mill includes a transversely reciprocating notching blade for producing a stress relieving notch in the periphery of the tubing, and a severing blade having a thickness less than that of the notching blade for severing the tubing through the notch. The tubing is clamped during the notching and severing operation by reciprocably mounted die jaws each of which comprises a pair of spaced apart, parallel clamping members between which the notching and severing blades may travel. The clamping members are provided with blade supporting parallel surfaces in the opposing spaces thereof for closely receiving the severing blade therebetween to prevent deflection of the severing blade during the cutting process. A first relieved area in the faces of the clamping members along one edge thereof allows passage of the thicker notching blade therebetween, while a second relieved area in the faces produces clearance between the clamping members to accommodate tubing material being deformed and severed away by the severing blade. The additional thickness of the notching blade produces a notch in the tubing of sufficient width to allow unimpeded initial penetration of the severing blade through the tubing in spite of minor variations in the alignment of the path of travel of the severing blade relative to the path of travel of the notching blade.

12 Claims, 7 Drawing Figures

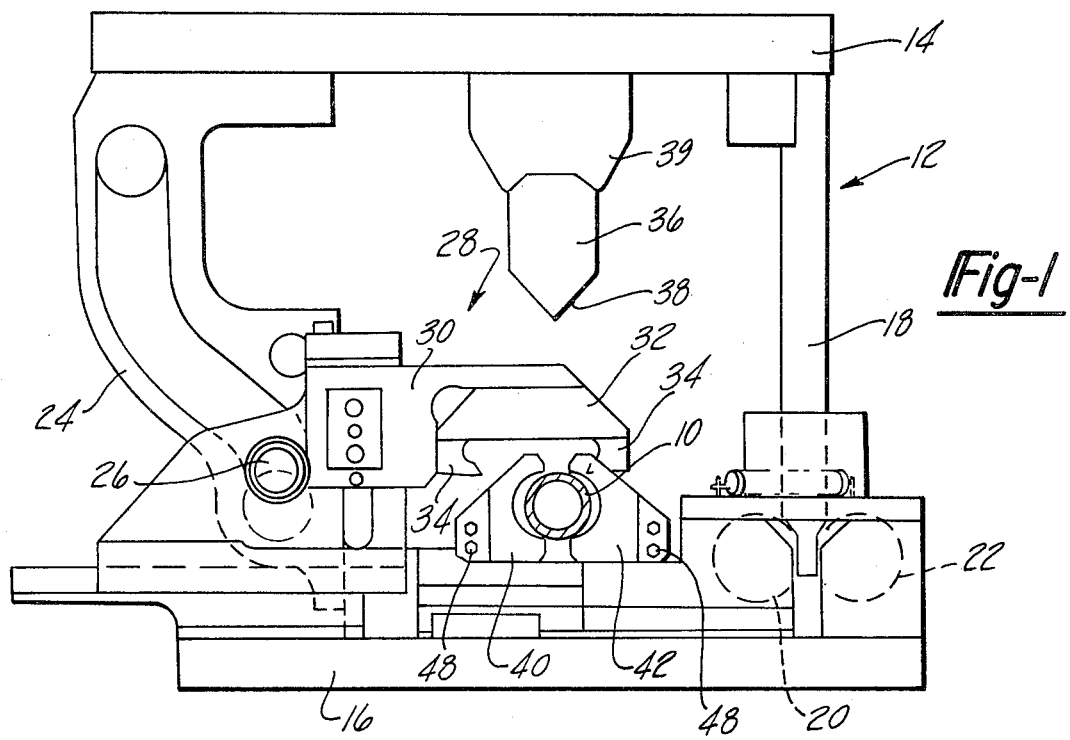
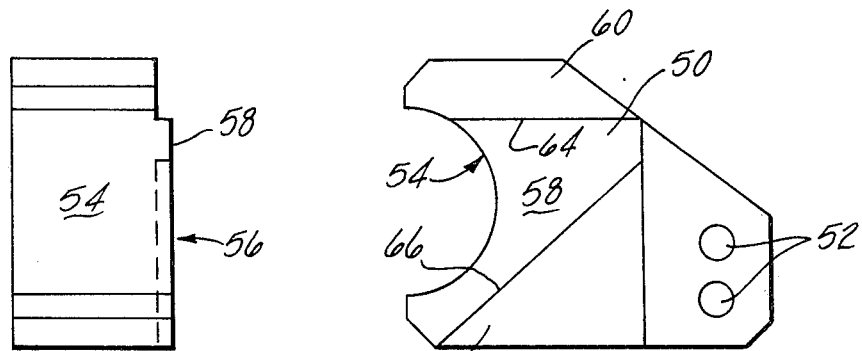
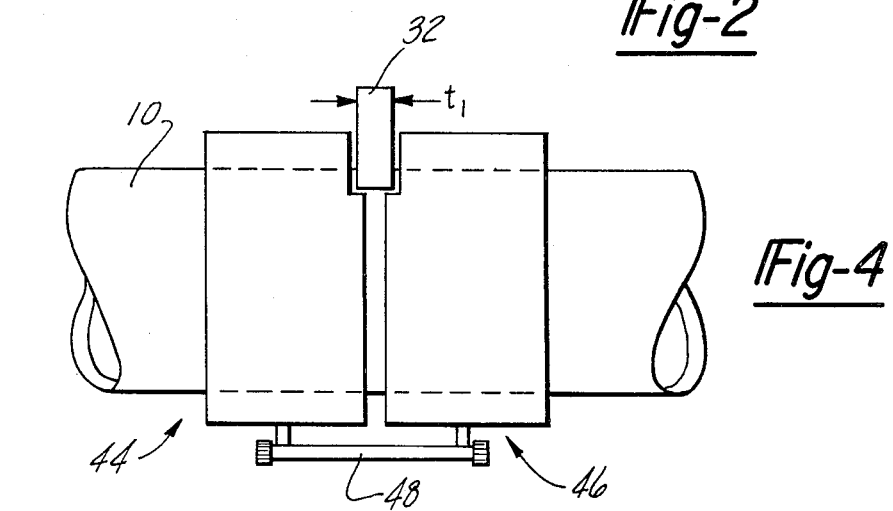

DIE JAW MEMBERS FOR TUBE CUTOFF APPARATUS

TECHNICAL FIELD

The present invention generally relates to cutoff apparatus of the type employed to sever successive lengths of tubing emanating from a source thereof, such as a mill, and deals more particularly with die jaws and blades employed to clamp and sever the tubing.

BACKGROUND ART

Apparatus for cutting off successive lengths of a continuously moving, elongate workpiece such as tubing emanating from a mill, is well known in the art. Typically, tube cutoff apparatus comprises a die set mounted on a carriage for selective acceleration along the length of the tubing. The die set and carriage are in turn mounted on a flying type ram which is operated in synchronism with the movement of the tubing. The die set includes a reciprocating severing blade operated by the ram for severing the clamped tubing as the die set and tubing move in unison. More recently, tube cutoff apparatus, such as that shown in U.S. Pat. No. 4,108,029, include a die set having a reciprocable notching blade for producing a stress relieving notch in the periphery of the tubing immediately prior to the severing operation.

The clamping jaws employed with the prior art tube cutoff apparatus of the type mentioned above typically employ a pair of reciprocable die jaws operated by the flying ram. These die jaws each comprise a pair of spaced apart clamping members stationarily mounted relative to each other and provided with clamping surfaces contoured to conformingly engage the sidewalls of the tubing. The clamping members include blade supporting surfaces spaced apart a distance marginally greater than the thickness of the severing blade; the severing blade passes between the blade supporting surfaces of the clamping members and is laterally supported by such surfaces so as to prevent blade deflection during the severing process. As shown in U.S. Pat. No. 3,924,502, the opposing faces of the clamping members may be provided with relieved steps or surface areas immediately adjacent the blade supporting surfaces and downstream in the stroke of the severing blade to provide additional clearance between the severing blade and the clamping members to accommodate the coined and compressed material being severed from the tubing. The cutoff apparatus of the type described above, although entirely suitable for most cutoff operations, is nevertheless subject to certain improvements as will be discussed below.

As previously indicated, the severing blade of prior art cutoff apparatus moves in a plane aligned with the path of travel of the notching blade. In some areas, the path of travel of the severing blade may not be precisely aligned with that of the notching blade, either due to wear over an extended period of use, or as a result of errors in original manufacturing tolerances. In the case of minor misalignment in the paths of travel of the notching and severing blades, the severing blade may initially engage the exterior sidewall of the tubing along the edge of the notch rather than penetrating the notch itself; as a result, inwardly directed stresses are placed on the sidewall of the tubing which may result in slight "dimpling" of a portion of the sidewall before the severing blade is deflected into the notch. This, of course, defeats the purpose of the notching blade since the distortion produced in the sidewalls by the dimples results in an inferior product suited for use in many applications.

Additionally, misalignment of the severing blade relative to the notching blade not only increases wear of the severing blade, but tends to produce additional drag on the severing blade, since such blade may frictionally engage the blade supporting surfaces of the clamping members. Additionally, misaligned severing blades tend to increase the amount of coined and formed tubing material which is drawn along with the blade as it is drawn out of the severed tube.

Heretofore, there has not been provision made for compensating for the effects of misalignment between the paths of travel of the notching and severing blade. The notching and severing blade have been of essentially equal thicknesses, and the opposing faces of the clamping members have been spaced apart a distance to closely receive and accommodate both blades.

Accordingly, it is an important object of the present invention to provide improved tube cutoff apparatus which eliminates each of the deficiencies inherent in prior art apparatus and yields satisfactory cutting quality in spite of minor misalignment of the cutting paths of the severing and notching blades.

Another object of the present invention is to provide tube cutoff apparatus with the type mentioned above in which the notching blade possesses a thickness greater than that of the severing blade so as to create a notch having an inherent tolerance sufficient to accommodate the path of travel of a severing blade not precisely aligned with the notch.

A still further object of the present invention is to provide tube cutoff apparatus as described above having improved die jaw clamping members adapted to receive the thicker notching blade, but yet which provides blade supporting surfaces for the severing blade to prevent deflection thereof during the severing operation.

Another object of the present invention is to provide improved die jaw clamping members of the type mentioned immediately above which provide clearance spaces between the members and the severing blade for receiving coined and formed material severed from the tube during the severing operation, thereby decreasing friction between the blade, the clamping members and the tubing, while improving the quality of the cut.

Another object of the invention is to provide cutoff apparatus as mentioned above which reduces the amount of drag or friction between the blade and the die jaws both on the forward and return stroke of the severing blade.

These and further objects of the invention will become clear or be made apparatus during the course of the following description of the invention.

DISCLOSURE OF THE INVENTION

An improved, ram operated tube cutoff apparatus of the type adapted for severing successive lengths of tubing continuously emanating from a source thereof such as a mill, includes a transversely reciprocable notching blade for producing a stress relieving notch in the periphery of the tubing, and a severing blade having a thickness less than that of the notching blade for severing the tubing through the notch. The tubing is clamped during the notching and severing operation by reciprocably mounted die jaws, each of which comprises a pair of spaced apart, parallel, clamping members between which the notching and severing blades may pass. The clamping members are provided with parallel, blade supporting surfaces in the opposite faces thereof for closely receiving the severing blades therebetween to prevent deflection of the blades during the severing process. A first relieved area in the faces of the clamping member along one edge thereof allows passage of the thicker notching blade, while a second relieved area in the faces of the clamping member provides clearance between the opposing faces of the clamping member to accommodate coined and formed tubing material produced by the severing process. The additional thickness of the notching blade produces a notch in the tubing of sufficient width to allow unimpeded initial penetration of the severing blade through the tubing, in spite of minor misalignment of the path of travel of the severing blade relative to the path of travel of the notching blade.

BRIEF DESCRIPTION OF THE DRAWINGS

In the drawings, which form an integral part of the specification and are to be read in conjunction therewith, and in which like reference numerals are employed to designate identical components in the various views:

FIG. 1 is an elevational view of tube cutoff apparatus which includes the improvement forming the preferred embodiment of the present invention;

FIG. 2 is a side elevational view of the face of one of the clamping members employed in the cutoff apparatus shown in FIG. 1;

FIG. 3 is an elevational view of one end of the clamping members shown in FIG. 2;

FIG. 4 is a fragmentary side view of a portion of the tubing gripped by the clamping members and showing the position of the notching blade during the notching operation;

BEST MODE FOR CARRYING OUT THE INVENTION

Figure 5:
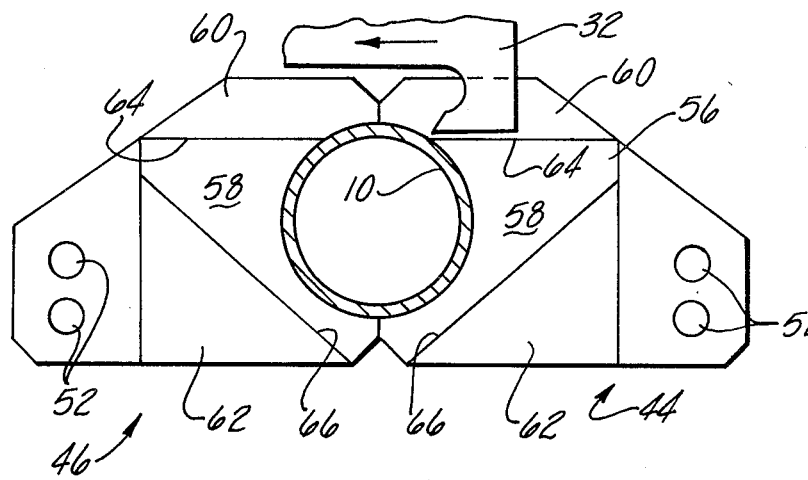
FIG. 5 is a fragmentary sectional view of one pair of the clamping members shown in a clamping position and depicting the position of the notching blade just prior to the notching operation.

Referring to the drawings, apparatus for cutting off successive lengths of an elongated workpiece, such as the tubing 10, is generally indicated by the numeral 12 and includes an upper, vertically shiftable die plate 14, and a lower stationary die plate 16. The cutoff apparatus 12 may be more commonly referred to as a die set and is adapted to be installed between the opposing platens of a flying type ram press (not shown). Die plate 14 is provided with a downwardly depending clamping cam 18 received between a pair of die jaw rollers 20 and 22 rotatably mounted on die plate 16.

Die plate 14 also includes a downwardly depending cam plate 24 secured thereto. A cam roller 26 mounted on cam plate 16 is confined for movement within the cam plate 24 and translates the vertical movement of cam plate 14 to horizontal, reciprocating movement which is imparted to a notching blade assembly generally indicated at 28. Notching blade assembly 28 includes a notching blade holder 30 operably coupled with cam roller 26. The cutoff apparatus thus far described above is essentially identical to that disclosed in U.S. Pat. No. 4,108,029, the entire disclosure of which is hereby incorporated by reference herein.

A notching blade 32 is securely mounted on notching blade holder 30 and has a pair of opposed hook portions 34 which extend downwardly so as to intersect the upper portion of the sidewall of tubing 10. As best seen in FIG. 4, the notching blade 32 has a preselected thickness $T_1$.

Figure 6:
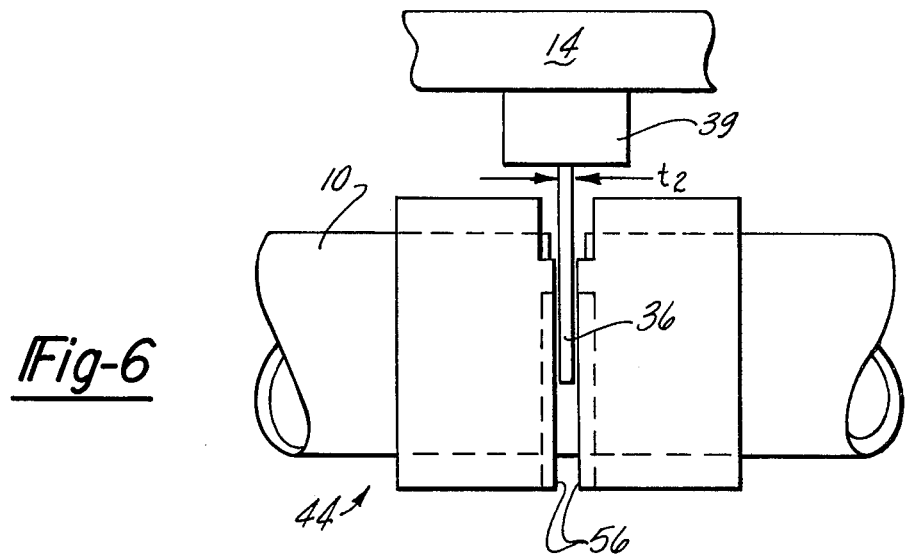
FIG. 6 is a fragmentary view similar to FIG. 4 but showing the position of the severing blade during the severing operation.
Figure 7:
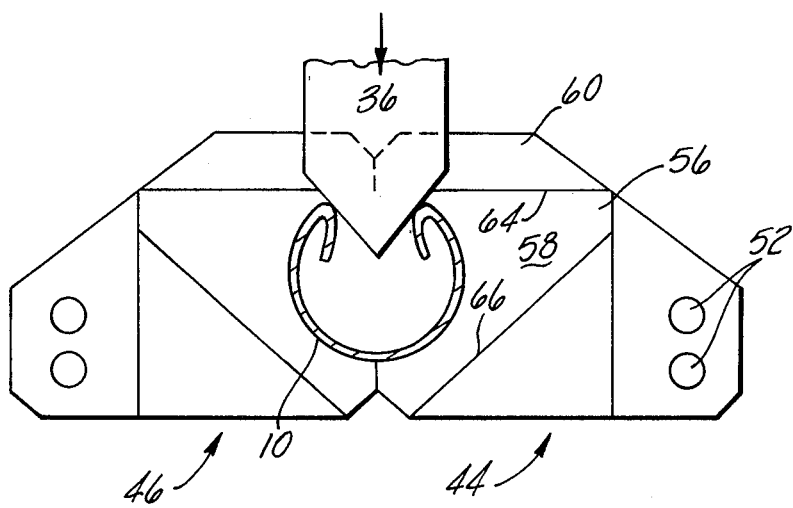
FIG. 7 is a view similar to FIG. 5 but showing the position of the severing blade during the severing operation.

The cutoff apparatus 12 further includes a severing blade 36 having a V-shaped cutting edge 38 and a blade thickness $T_2$, as shown in FIG. 6, which is less in magnitude than the thickness $T_1$ of notching blade 32. Severing blade 36 is secured to the die plate 14 by means of a mounting bracket 39 so as to be vertically reciprocable along with die plate 14. Notching blade 32 and severing blade 36 are respectively adapted to move, as the elevation of die plate 14 changes, in paths of travel which lie in an essentially vertically extending, single plane.

The cutoff apparatus 12 further includes a pair of clamping die jaws 40 and 42, respectively, each slidably mounted for unidirectional movement toward and away from each other on the die plate 16 in accordance with the rectilinear movement of die jaw rollers 20 and 22 which are respectively coupled with die jaws 40 and 42.

As shown in FIGS. 2 through 7, each of the die jaw members 40 and 42 comprises a pair of opposed, spaced apart clamping members 44 and 46 secured in fixed relationship to each other by bolts 48 or the like. Each of the clamping members 44 and 46 includes a body 50 having a pair of bores 52 transversely therethrough to receive the mounting bolts 48, and a clamping surface 54, particularly shown in the drawings as being semi-cylindrical in shape in order to conformingly engage the sidewall of tubing 10. The clamping members 44 and 46 further include opposing, parallel extending faces, as at 56 which are spaced apart a selected distance, as will be discussed more fully hereunder. The faces 56 extend transversely to the clamping surface 54 and are defined by a flat, blade supporting surface 58, first relieved surface portions 60 and second relieved surface portions 62. The blade supporting surface 58 extends up to one edge of the face 56 circumscribing the major part of the clamping surface 54 and is partially defined by an upper edge 64 which extends parallel to the direction of travel of the notching blade 32 and is spaced below the apex of the tubing 10. Edge 64 defines the transition between plate supporting surface 58 and the first relieved surface portion 60. First relieved surface portions 60 extend along the entire upper edge of the face 56. The spacing between the first relieved surface portions 60 of the clamping members 44 and 46 is marginally greater than the thickness $T_1$ of the notching blade 32 so as to define a spot in upper regions of the clampings jaws 40 and 42 through which the notching blade 32 may pass.

The blade supporting surfaces 58 of the clamping members 44 and 46 are spaced apart a distance marginally greater than the severing blade 36 so as to closely receive the severing blade 36 therebetween during the severing operation.

The second relieved surface portions 62 are defined by an edge 66 extending oblique to the path of travel for both the notching blade 32 and severing blade 36. The second relieved surface portions 62 extend downwardly along the bottom edge of the face 56. The second relieved surface portions 62 of the clamping members 42 and 46 are spaced apart a sufficient distance to define a clearance between the face 56 and the severing blade 36 within which coined or deformed material severed from the tubing 10 by severing blade 36 may be received. Thus, from the foregoing, it may be appreciated that the first and second relieved surface portions 60 and 62 are disposed on opposite sides of the blade support surface 58, and along opposite edges of the face 56.

In operation, after cam 18 closes the die jaws 40 and 42 on the tubing 10, the notching blade 32 is drawn transversely through the clearance defined by first relieved surface portions 60 and through the periphery of the tubing 10 to produce a notch in the tubing 10. The notch thusly produced in the tubing 10 has a width greater than the thickness $T_2$ of the severing blade 36 so as to be aligned with the path of travel of the severing blade 36, even if the latter is slightly out of alignment with respect to the center line of such notch. The severing blade 36 then moves downwardly along with the die plate 14 to enter the notch and commence the severing operation. The blade supporting surfaces 58 closely receive the sides of the severing blade 36 and prevent the same from deflecting as the tubing is cut. As cutting of the tubing 10 is initially commenced, severed material is coined inwardly into the interior of the tubing. However, as the severing blade 36 reaches the halfway point in the severing operation, the severed tubing material is actually being crushed and becomes coined outwardly in ever increasing quantities. As the collapsed and coined material reaches the edge 66, a clearance space defined by the second relieved surface portions 62 is provided to accommodate the growing quantity of material and thereby reduces the friction and heat generated by the severing operation. Upon completion of the severing operation, the severed material falls through its own weight from the die jaws 40 and 42 through an opening in the bottom of the clamping members 44 and 46 defined by the lower edge of the second relieved surface portions 62. As the severing blade 36 moves upwardly towards its starting position, material tending to adhere or remain on the blade 36 is scraped off by the blade supporting surfaces 58, and particularly along the edge 66.

It should be pointed out here that the first relieved portions 60 not only provide for increased clearance for the thicker notching blade 32, but reduce the overall blade supporting surface area 58, thereby in turn reducing the amount of friction or drag encountered when the severing blade 36 is slightly out of alignment and slidably contacts the surface areas 58.

From the foregoing, it is apparatus that the cutoff die set and improved die jaws described above not only provide for the reliable accomplishment of the objects of the invention but do so in a particularly simple and effective manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

Having thus described the invention, what is claimed is:

1. For use with apparatus for cutting off lengths of an elongate workpiece and of the type including a notching blade and a severing blade respectively shiftable in first and second paths of travel within a reference plane and transverse to said workpiece for respectively producing a notch in the periphery of said workpiece and for severing said workpiece through said notch, a pair of opposed clamping members for holding said workpiece during notching and severing thereof, each of said clamping members comprising:
a body of rigid material having a blade supporting surface in one face thereof extending essentially parallel to said reference plane and in close proximity to said severing blade, said body further including
(1) a clamping surface configured to complementally engage a side of said workpiece,
(2) first surface portions relieved relative to said blade supporting surface defined in said one face thereof adjacent said blade supporting surface and aligned with said first path of travel
the first relieved surface portions of the bodies of an associated pair thereof defining a slot in said pair of clamping members through which said notching blade may pass.

2. The clamping member of claim 1, wherein said body further includes second surface portions defined in said one face thereof on one side of and relieved relative to said blade supporting surface and spaced from said first relieved surface portions.

3. The clamping member of claim 2, wherein:
said first relieved surface portions extend along one outer edge of said one face,
said second relieved surface portions extend along another outer edge of said face, and
said blade supporting surface is disposed between said first and second relieved surface portions.

4. The clamping member of claim 1, wherein said clamping surface is arcuate in shape and extends transverse to and is continuous with said first relieved surface portions.

5. The clamping member of claim 4, wherein said body further includes second surface portions in said one face thereof and relieved relative to said blade supporting surface, and second relieved surface portions extending along one edge of said face and spaced from said first relieved surface portions.

6. The clamping member of claim 5, wherein one edge of said second relieved surface portions extend in a direction oblique relative to said first and second paths of travel.

7. The clamping member of claim 1, wherein said body further includes at least one bore therethrough for use in mounting the clamping members of each pair thereof in fixed relationship to each other.

8. Cutoff apparatus for severing lengths of a tubular workpiece, comprising:
a notching blade adapted to be mounted for movement in one direction transverse to the longitudinal axis of said workpiece and having a thickness to produce a transversely extending notch in the periphery of said workpiece;
a severing blade adapted to be mounted for movement in another direction transverse to said longitudinal axis and through said notch to sever said workpiece, said severing blade having a thickness less in magnitude than the thickness of said notching blade; and means for holding said workpiece during movement of said notching and severing blades, said holding means including at least one pair of spaced apart clamping members, said clamping members comprising (1) a pair of spaced apart, opposing faces including blade supporting surfaces extending essentially parallel to said another direction of travel, said blade supporting surfaces being spaced apart a distance marginally greater than the thickness of said severing blade whereby to closely receive said severing blade therebetween upon movement of said severing blade through said workpiece;

(2) a pair of surface portions respectively in said faces adjacent said blade supporting surfaces and respectively disposed on opposite sides of said one direction of travel, said pair of surface portions being spaced apart a distance greater than the thickness of said notching blade to receive said notching blade therebetween upon movement of said notching blade.

9. The apparatus of claim 8, wherein said clamping members further include a pair of surface areas respectively in said faces adjacent said blade supporting surfaces and spaced from said pair of surface portions, said pair of surface areas being spaced apart a distance greater than the spacing between said blade supporting surfaces to produce clearance between said severing blade and faces for accommodating portions of said workpiece severed by said severing blade.

10. The apparatus of claim 9, wherein said pair of surface areas extend along one set of outer edges of the respectively associated faces, and said pair of surface portions extend along another set of outer edges of said faces.

11. The apparatus of claim 8, wherein each of said clamping members further includes a clamping surface extending transverse to the corresponding face and adapted to conformingly engage said workpiece.

12. The apparatus of claim 8, wherein:

one edge of each of said pair of surface portions extends essentially perpendicular to said one direction, and one edge of each of said pair of surface areas extends oblique to said one and said another directions.

* * * * *